United States Patent [19]
Mardas

[11] 3,735,050
[45] May 22, 1973

[54] ELECTRICAL STORAGE CIRCUIT

[75] Inventor: Alexis Mardas, London N. W. 2, England

[73] Assignee: Modern Telephones Limited, London, England

[22] Filed: July 16, 1971

[21] Appl. No.: 163,279

[30] Foreign Application Priority Data

July 21, 1970 Great Britain .................35384/70

[52] U.S. Cl. ................179/90 B, 340/345, 340/172.5
[51] Int. Cl. ..............................................H04m 1/26
[58] Field of Search ............340/172.5, 345, 347 DA, 340/347 DD; 179/90 B; 235/155; 307/221, 226

[56] References Cited

UNITED STATES PATENTS 3,555,201 1/1971 Kuehnle ..............................340/345
3,588,362 6/1971 Kass ...................................179/90 B
3,670,111 6/1972 Bukosky ............................179/90 B

*Primary Examiner*—Ralph D. Blakeslee
*Attorney*—Donald A. Kaul, David S. Abrams, Robert H. Berdo, Donald C. Roylance and Walter C. Farley

[57] ABSTRACT

An electrical storage circuit suitable for use as a repertory dialler in a telephone system in which the digits of a number to be dialled are stored at respective addressed locations in a co-ordinate store constituted by active bistable devices as four bit words, and words read out from the store are applied via an inverter to a four bit counter which is stepped until each stage is set at 1 in synchronism with an output from a pulse generator to give a digital output according to an addressed word associated with a particular digit of a stored number at a rate governed by the frequency and duration of the clock pulse output from the generator.

7 Claims, 1 Drawing Figure

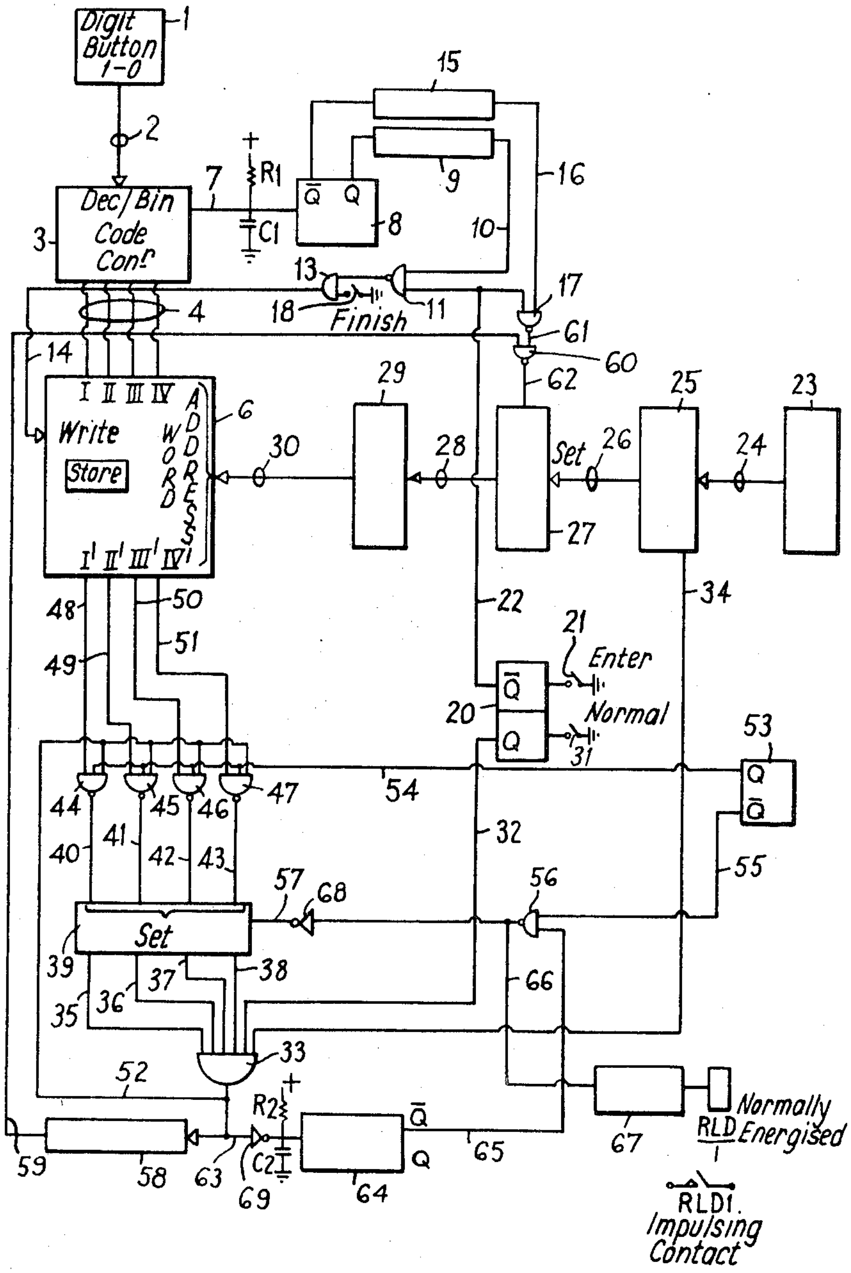
Digit Button 1-0
Dec/Bin Code Conr
R1
C1
Q̄ Q
Finish
Write
Store
WORD
ADDRESS
I II III IV
I' II' III' IV'
Set
Enter
Normal
Q̄
Q
Set
R2
C2
Q̄
Q
Normally Energised
RLD
RLD1. Impulsing Contact

ELECTRICAL STORAGE CIRCUIT

This invention relates to an electrical storage circuit which is capable of being programmed to provide a digital output upon the receipt of an instruction.

Such a circuit is of particular value in providing dialling impulses from a telephone subscriber to an automatic telephone exchange in a comparatively simple manner. It is possible, by means of a circuit in accordance with the present invention, to transmit all of the digits associated with a number to be dialled upon the operation of a single key.

The circuit arrangement may be programmed by the subscriber and the digits to be transmitted for each number to be dialled are stored in such a way that the subscriber may easily change them.

According to the present invention there is provided an electrical storage circuit which includes a store, a first input to the store for a binary digit word code to be stored, a second input to the store for an address signal identifying the location of a respective word in the store, a parallel output from the store for the binary digits of a stored word, a plurality of first gates each connected to a respective binary digit output of the word, a first binary digit counter connected to the outputs of the first gates, a second gate connected to the outputs of the first counter, an output from the second gate connected to an input of each of the first gates, and a pulse generator connected to the input of each of the first gates, whereby a pulsed output is obtained from the second gate according to the word stored at an addressed location.

In one embodiment of the invention an electrical circuit provides a digital output signal and includes a store, in which in a first condition, information is stored in a location according to an instruction signal and in a second condition information is read out of the store upon the receipt of a corresponding instruction signal, thereby to provide a digital output signal corresponding to the stored information.

Such an electrical circuit avoids the disadvantages of the known mechanical key sender or repertory dialling devices caused by contact bounce.

In a preferred embodiment of the invention the information to be stored is received by the store in binary coded form from a code converter, to the input of which signals in decimal form are applied upon the operation of a digit button.

The instruction signal, in this particular embodiment, is obtained from a keyboard having a plurality of keys, each of which constitutes a digit button and corresponds to a particular digit of a number to be dialled.

In a first condition of the circuit, the operation of an instruction key followed by the consecutive operation, of a series of digit buttons results in the storage in the said circuit of information relating to the digit buttons in locations determined by the particular instruction key and thus in the storage of a number according to the sequence of operation of the digit buttons.

In a second condition of the circuit the binary coded signals associated with a particular number to be dialled are read out from the store by the operation of a particular instruction key. The binary coded signals readout from the store are decoded by feeding their inverse into a counter, thereby setting the counter, which then counts until each stage of the counter is set to 1. The rate at which the counter is counted corresponds to the dialling impulse rate and each of the impulses is arranged to cause the operation of a relay having impulsing contacts which are connected in a telephone line. Means are provided for introducing the required pauses between the digits.

An embodiment of the invention will now be described with reference to the single FIGURE of the accompanying drawing which shows a schematic circuit diagram of a pushbutton operated dialling unit for the transmission of digits from a subscriber to a telephone exchange.

Referring to the drawing there is shown a unit 1 having 10 digit buttons, 1 to 0, and a plurality of corresponding outputs, indicated at 2, which are connected to a decimal-binary code converter 3. The code converter 3 has four outputs, indicated at 4, to the inputs I, II, III and IV of a store 6. A second output 7 from the code converter 3 is applied via time constant network $R_1$ $C_1$ to a Schmitt trigger circuit 8. A first output Q from the Schmitt trigger circuit 8 is applied via a negative-triggered monostable circuit 9 and a line 10 to a NAND (not-and) gate 11. The output of the NAND gate 11 is applied to one input of a gate 13 whose output provides a "write" signal on a line 14 to the store 6.

A second output $\overline{Q}$ from the Schmitt trigger circuit 8 is applied via a negative-triggered monostable circuit 15 and a line 16 to a NAND gate 17. The symbol $\overline{Q}$ as used herein at an output of a bistable circuit indicates that the output is set at 0 under quiescent conditions. A "finish" switch 18 is provided to connect an earth signal to the second input of the gate 13 upon the completion of the entry of a number into the store 6. A bistable circuit 20, having an input from earth via an "enter" switch 21, has an output $\overline{Q}$ set to zero under quiescent conditions on a line 22 and applied to one of the inputs of the NAND gates 11 and 17.

A key-pad 23 having a plurality of keys, each one of which corresponds to a number to be dialled, has a plurality of outputs 24 applied to the input of a binary encoder 25. The binary encoder 25 provides a parallel output of binary digits on lines 26 to set a counter 27. The counter 27 has a plurality of parallel outputs on lines 28 connected to an address code converter 29 from which a code output is obtained on one or more of a plurality of lines 30 to address a location in the store 6 for the writing-in of a word. A second input to the bi-stable circuit 20 is provided via a "normal" switch 31 is operable to connect the input to earth. An output Q from the bi-stable circuit 20 is connected via a line 32 to a gate 33. An input to the gate 33 is also provided over a line 34 from the binary encoder 25. Inputs to the gate 33 on lines 35 to 38 are provided from a four bit counter 39 whose input is connected to enable the counter to be set via lines 40 to 43 to the outputs of gates 44 to 47. The gates 44 to 47 are connected via lines 48 to 51 to the parallel outputs I', II', III' and IV' from the store 6 respectively.

An output from the gate 33 is provided on a line 52 to the inputs of the gates 44 to 47. A free-running pulse generator 53 having a mark to space ratio of 1:1 and providing an output at 10 impulses per second has its output Q connected on a line 54 to the inputs of the gates 44 to 47. The output $\overline{Q}$ from the pulse generator 53 is applied on a line 55 to a gate 56 and the output of the gate 56 is connected via an inverter 68 and a line 57 to an input of the four bit counter 39.

The output from the gate 33 is also connected via a monostable circuit 58 on a line 59 to an input of a gate 60 whose other input is connected via a line 61 to the output of the NAND gate 17. The output of the gate 60 is connected on a line 62 to the input of the counter 27. The output from the gate 33 is also connected on a line 63 via an inverter 69 and a time constant circuit $C_2R_2$ to a Schmitt trigger circuit 64. An output $\overline{Q}$ from the Schmitt trigger circuit 64 is connected on a line 65 to a second input of the gate 56. The output from the gate 56 is also connected on a line 66 to a monostable circuit 67 whose output is connected to energize a relay RLD/1 having an impulsing contact RLD 1.

In the particular example described the store 6 is a random access co-ordinate store employing active bistable semi-conductor devices, for example flip-flops, though other well-known types of store may be used.

The particular dialling circuit described is capable of storing several 16-digit telephone numbers and automatically dialling out any desired number when a key, on the key-pad 23, associated with a particular number is operated. The number to be associated with any one of the keys on the key-pad 23 may be that set at will by the operation of a succession of buttons on the unit 1. In the particular embodiment being described every digit of a telephone number to be stored is represented by a four binary-digit word and since every stored number can consist of up to 16 digits, plus a final digit to give a stop signal, the total capacity required of the store is 17N words, where N is the required number of stored telephone numbers.

The operation of a key on the key-pad 23 provides an instruction signal which causes the signals appearing in binary-digital form at the inputs I, II, III and IV of the store 6 to be written into the store at a location addressed by a signal which is a function of the instruction signal from the key-pad 23. There are thus 17N combinations of the word or digit locations to be addressed. In order to provide this number of addresses the counter 27 must be capable of counting to at least 17 N, so that for every stored word or digit there exists a unique state of the output of the counter 27. The address code converter 29 decodes the output of the counter 27 to produce a required address for a word or digit location and thus any digit may be read into or out of the store, according to the condition of the circuit, by setting the store 27 to an appropriate count corresponding to that digit. The contents of the store are thus arranged in N groups of 17 words each. Each group of words has associated therewith a series of 17 counter states so that a complete telephone number may be written-in or read-out in serial form by setting the counter 27 initially to a particular state corresponding to the location of the first word or digit of the relevant group and then advancing the code set on the counter to cause the locations of successive digits to be addressed, as required.

These and other features of the circuit will become more clear from the following description of the operation of the circuit.

In order to enter a telephone number into the store the "enter" switch 21 is closed, causing the bistable circuit 20 to change its state and the output Q thereof to be set to 1, preparing the NAND gates 11 and 17 for operation. One of the N keys on the key-pad 23, which is to be associated with a particular telephone number, is then depressed and a parallel output, distinctive of the operated key, is provided on the lines 24 to the binary encoder 25. The binary output code from the encoder 25 is then supplied over the lines 26 to set the counter 27. A parallel output, providing a reading of the state of the counter 27, is applied via the lines 28 to the address code converter 29, whose coded output is applied via respective ones of the lines 30 to the store 6, thereby addressing a particular location in the store 6.

Upon the operation of one of the digit buttons 1 to 0 of the unit 1, a corresponding input is provided on the lines 2 to the decimal-binary code converter 3, whose output in binary form is connected to the inputs I, II, III and IV of the store 6.

AT the same time the output on the line 7 from the converter 3 is set to 0, thereby causing the condition of the Schmitt trigger circuit 8 to change and the outlet Q thereof to be set to 0. The monostable circuits 9 and 15 connected to respective outputs of the circuit 8 are negative-edge triggered, so that when the condition of the circuit 8 changes and the input to the monostable circuit 9 is set to 0, the monostable circuit 9 operates, thereby producing a positive pulse on the line 10 connected to the NAND gate 11. With the output of the bistable circuit 20 already applied to the gate 11, the gate 11 output is set to 0 so that the gate 13 is set to 1 thereby applying an input on the line 14 to the store 6 and causing the required digit code set up on the inputs I, II, III and IV to be written in at the address located by the signal on the selected ones of the lines 30.

When the digit button on the unit 1 is released the output on the line 7 from the code converter 3 is set to 1, thereby causing the time constant circuit $R_1C_1$ to charge. After a short time delay due to the time taken to charge $C_1$, the Schmitt trigger circuit 8 resets and its output $\overline{Q}$ is set to 0 thereby triggering the monostable circuit 15 and providing a positive going signal at its output, which is applied via the line 16 to the NAND gate 7 and the gate 60 to the counter 27, thereby resulting in the counter 27 being advanced and the location for the next word or digit of the number which it is required to be stored being addressed in the store 6. The next digit of the number to be stored may now be entered into this store and the process continued until all of the digits of the required number have been entered. When the number has been entered the "finish" switch 18 is operated, thereby setting the output of the gate 13 to 1 and providing a "write-in" signal on the line 14 to the store 6.

Since none of the digit buttons of the unit 1 is now operated, the inputs I, II, III and IV of the store 6 are set to zero and the code 0000 is entered into the store. The circuit is restored to normal operation by the operation of the "normal" switch 31 which causes the output $\overline{Q}$ of the bistable circuit 20 to be set to 0 and the gates 11 and 17 to be inhibited.

Any one of N numbers corresponding to the N keys on the key-pad 23 may be entered into the store 6 at a selected location and any of the stored numbers may be changed by repeating the operation, thereby erasing the originally stored number, and introducing a new number at the same location in accordance with a new sequence of operation of the digit buttons. When the circuit is at rest with none of the keys, buttons, or switches operated the inputs to the gate 33 on each of the lines 35 to 38 from the counter 39 is set to 1. In addition the input to the gate 33 on the line 32 from the output Q of the bistable circuit 20 is also at 1. Furthermore, the input to gate 33 on the line 34 from the binary encoder 25 is at 1 and the output of the AND gate 33 is, in this condition, at 1. With the output from the gate 33 set at 1, the output Q from the Schmitt trigger circuit 64 is set at 0 thereby resulting in a signal on the line 65 which inhibits dialling pulses from the generator 53 passing through the gate 56.

In order to read-out a particular number to be dialled from the store, the corresponding key on the key-pad 23 is depressed resulting in signals being applied on one of the lines 24 to the binary encoder 25. The binary coded parallel output from the encoder 25 on the lines 26 sets the encounter 27 to the first value of the series associated with the depressed key on the key-pad. The output from the binary encoder 25 on the line 34 is set to 0 when any key is depressed, thereby inhibiting the gate 33, the output of which is thus set to 0 and, in turn, inhibits the gates 44 to 47.

The setting of the counter 27 to the first value results in a parallel output from the counter 27 on the lines 28 to the address code converter 29 and an output from the converter 29 on one of the lines 30 to address the particular location at which the first digit of the required number is stored in the store 6, according to the instruction received from the operated key-pad 23. The result of addressing the particular location in the store is that binary signals corresponding to the word or digit stored at the location in binary form appear at the outputs I', II', III' and IV' of the store 6.

Upon the release of the key which has been depressed, the output from the binary encoder 25 on the line 34 goes to 1, thereby allowing the output from the gate 33 to go to 1.

The output from the gate 33 on the line 52 prepared the gates 44 to 47 for operation. The output from a particular one of the gates, 44 to 47 thus goes to zero when the corresponding output I', II', III' and IV' from the store 6 is 1 and the Q output of the pulse generator 53 goes to 1. The parallel output from the gates 44 to 47, which sets the counter 39, is thus the inverse of the binary code which has been stored in the store 6.

The relation between the digit of the number to be dialled, the binary code stored in the store 6 and the output from the counter 39 on the lines 35 to 38 may be seen from the following Table.

TABLE

| Stored digit | Stored Code I | II | III | IV | Counter Output |
|---|---|---|---|---|---|
| None | 0 | 0 | 0 | 0 | 1 1 1 1 |
| 1 | 0 | 0 | 0 | 1 | 1 1 1 0 |
| 2 | 0 | 0 | 1 | 0 | 1 1 0 1 |
| 3 | 0 | 0 | 1 | 1 | 1 1 0 0 |
| 4 | 0 | 1 | 0 | 0 | 1 0 1 1 |
| 5 | 0 | 1 | 0 | 1 | 1 0 1 0 |
| 6 | 0 | 1 | 1 | 0 | 1 0 0 1 |
| 7 | 0 | 1 | 1 | 1 | 1 0 0 0 |
| 8 | 1 | 0 | 0 | 0 | 0 1 1 1 |
| 9 | 1 | 0 | 0 | 1 | 0 1 1 0 |
| 0 | 1 | 0 | 1 | 0 | 0 1 0 1 |

The resulting output from the counter 39 on the lines 35 to 38 may be seen from the Table to be such that for each of the words of the digits 1 to 0, the output of the gate 33 is set to zero, thereby inhibiting the gates 44 to 47 an triggering the monostable circuit 58, the positive going pulse output of which is applied to the gate 60, whose output causes the counter 62 to be advanced and the binary code corresponding to the second digit of the number to be dialled to appear at the parallel outputs I', II', III' and IV' of the store 6.

The setting of the output from the gate 33 to zero results in a signal being applied via the inverter 69 to the Schmitt trigger circuit 64 which is caused to change state after a time delay determined by the time constant of the network $R_2C_2$. The Q output of the Schmitt trigger circuit 64 thus goes to 1 and the inhibition is removed from the gate 56 which is opened upon the receipt of pulses from the Q output of the free running pulse generator 53, enabling the pulses to be passed both to the monostable circuit 67 and via the inverter 68 and the line 57 to the counter 39. At the positive edge of each pulse the monostable circuit 67 is triggered, thereby releasing the normally energized relay RLD/1 for 66 ms. and at the negative edge of each pulse the counter 39 is advanced. The impulses from the pulse generator 53 are of 50 ms. duration and the counter is therefore advanced before the end of the break impulse of the contact RLD1 of the relay RLD/1.

The circuit is arranged to count and pulse the relay until the counter 39 is set at 1111. This operation will be better understood by considering a particular case, for example when the binary-code to be read-out is 0101 corresponding to the digit 5.

In this situation the initial setting of the counter 39 is 1010, as may be seen from the Table. The counter 39 is then advanced in steps, each corresponding to an output pulse, so that it reads successively 1011, 1100, 1101, 1110, and 1111.

With the output of the counter 39 at 1111, the output of the gate 33 is again set to 1 and a signal is applied via the inverter to the network $R_2C_2$ which is discharged, resulting in the Schmitt trigger circuit 64 being reset and the gate 56 being again inhibited. However, the inhibition is removed from the gates 44 to 47 so that when the Q output of the generator 53 next goes to 1, the second digit of the required number, which is already, available at the outputs I', II', III' and IV' of the store 6, is set up on the counter 39.

The setting up of the second digit causes the 1111 output of the counter 39 to change, so that the output of the gate 33 again goes to 0, inhibiting the gates 44 to 47, triggering the monostable circuit 58 to address the third word of the stored information, and removing the short-circuiting earth from C2, which begins to charge. After a period of about 200 ms. forming the interdigital pause, the Schmitt trigger circuit 64 again changes state, removing the inhibition from the gate 56 and allowing the second digit to be pulsed out.

The whole process is then repeated for the third, fourth etc. digits. At the end of the penultimate digit, the counter 39 goes to the state 1111, and, as described, the last digit is set on the counter 39 and the counter 27 is stepped on. Thus the 'stop' condition (0000) appears at the gates 44 to 47, and, at the end of the last digit, when the counter 39 reaches the state 1111, this stop condition is set up, inverted as before, on the counter 39, so that the counter 39 output remains in the state '1111'.

Thus the generator pulses remain inhibited and counter 39 is not stepped on. No further digits are transmitted, and the counter rests in the state '1111'.

Subsequent depression of a key on the key-pad 23 causes the whole process to be repeated.

Although the invention has been described with reference to a particular embodiment, it will be understood that other circuit arrangements may be used to perform the invention, for example other forms of coding and word storage circuits may be used, the number of digits and addresses may be varied and the circuit may be constructed, at least in part, in an integrated form.

I claim:

1. An electrical storage circuit including a random access store; a first input to the store; a plurality of digit switches; a decimal to binary code converter connected between said digit switches and said first input to the store to provide a parallel input to the store in the form of binary coded words according to the serial operation of the digit switches; a second input to the store for an address signal identifying the location of a respective group of said words in the store; and means for reading a group of words out of the store according to a location in the store addressed by an address signal without removing the word information from the store, said means for reading out the group of words including a counter; an inverter connected between the output from the store and the counter; and a pulse generator having an output applied to control the counting down of the counter whereby a pulse train output corresponding to an output from the store according to an addressed word is provided.

2. A circuit as claimed in claim 1 including an address code converter and a second counter, the address code converter and the second counter being connected in series between the address signal input and the second input to the store, a connection between the decimal to binary code converter and the second counter and a connection between the second gate and the second counter, whereby upon the writing in or reading out of a word from the store the second counter is stepped to address the location of a successive word.

3. A circuit as claimed in claim 2 including a keypad providing a signal corresponding to the address of the word and a binary encoder, the keypad being connected to the input of the binary encoder and the output of the binary encoder being connected to the input of the second counter.

4. A circuit as claimed in claim 3 including an impulsing relay and a third gate, a second output from the pulse generator and the output from the second gate being connected to the input to the third gate and the output from the third gate being connected to the impulsing relay.

5. A circuit as claimed in claim 4 wherein the output from the third gate is also connected to step the first counter.

6. A circuit as claimed in claim 2 including a Schmitt trigger circuit and an input to the store for a write signal, the Schmitt trigger circuit being in the connection between the decimal to binary code converter and the second counter and having its input connected to the output of the decimal to binary code converter, one output connected to step the second counter and the other output connected to the write input fro the store.

7. A circuit as claimed in claim 4 including a time delay circuit in the connection between the output from the second gate and the input to the third gate.

* * * * *